3 Sheets—Sheet 1.
J. B. EAVES.
COTTON-CHOPPER.
No. 189,347. Patented April 10, 1877.
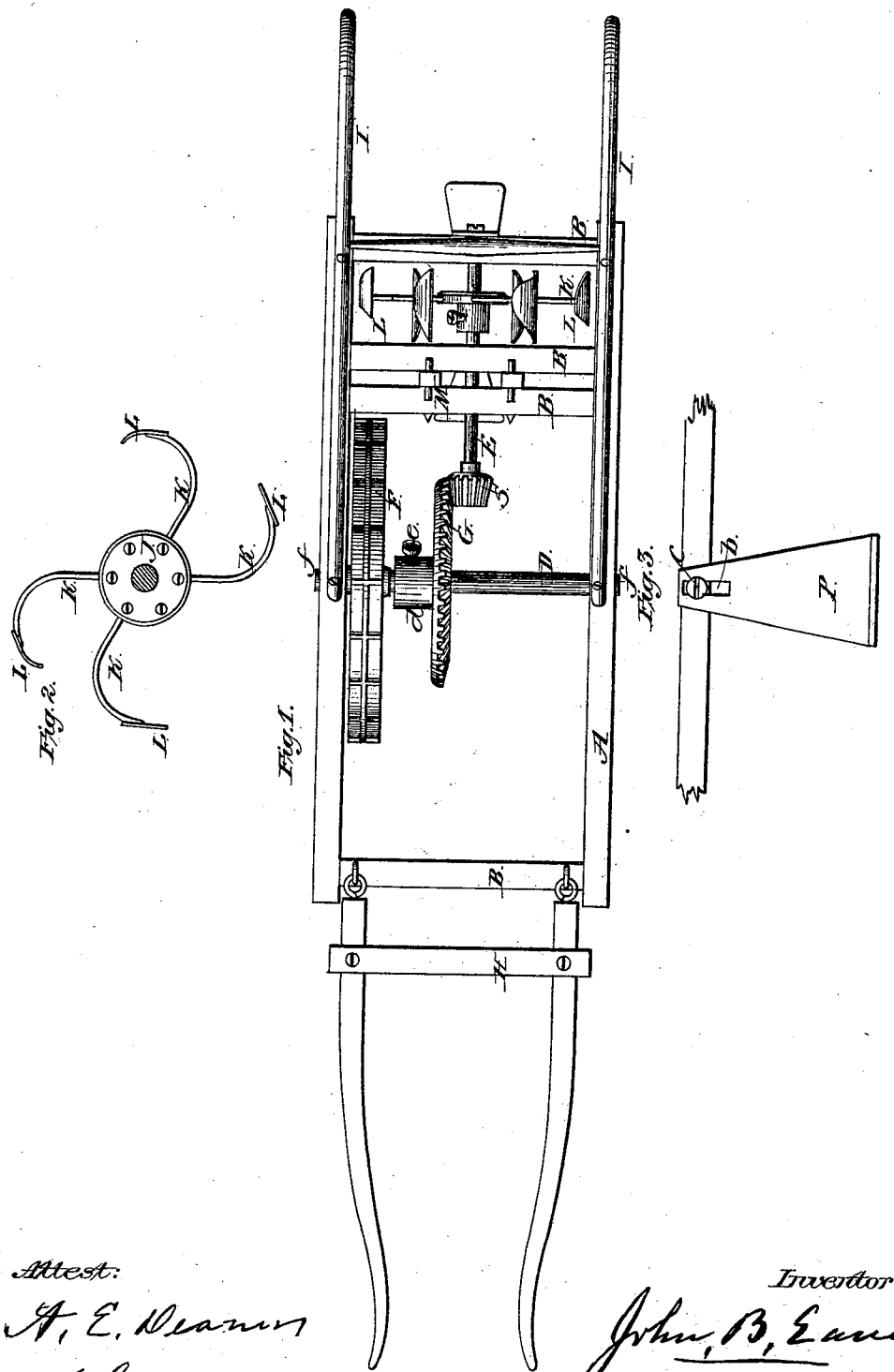

J. B. EAVES.
COTTON-CHOPPER.
No. 189,347. 3 Sheets—Sheet 2. Patented April 10, 1877.
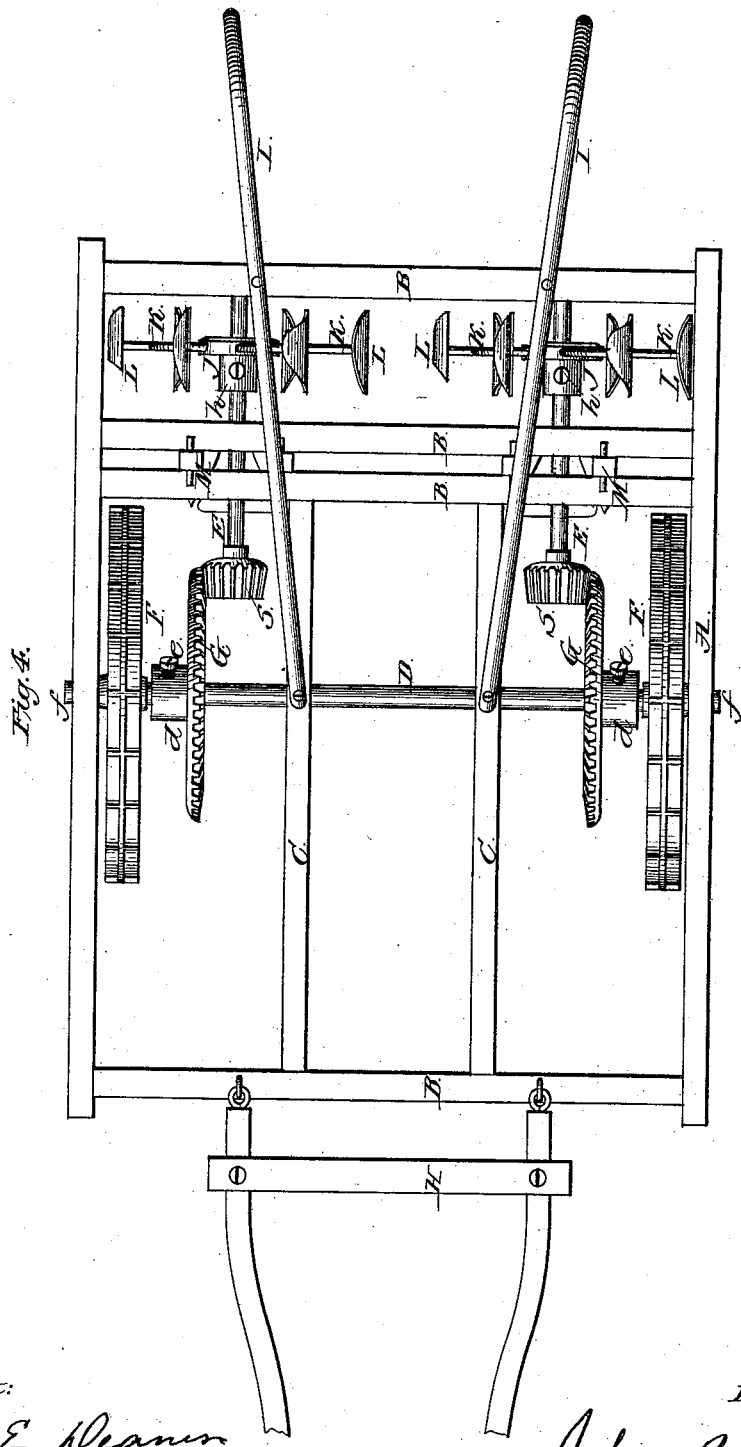
Attest:
A. E. Deane
A. Scott
Inventor:
John B. Eaves 3 Sheets—Sheet 3.
J. B. EAVES.
COTTON-CHOPPER.
No. 189,347. Patented April 10, 1877.
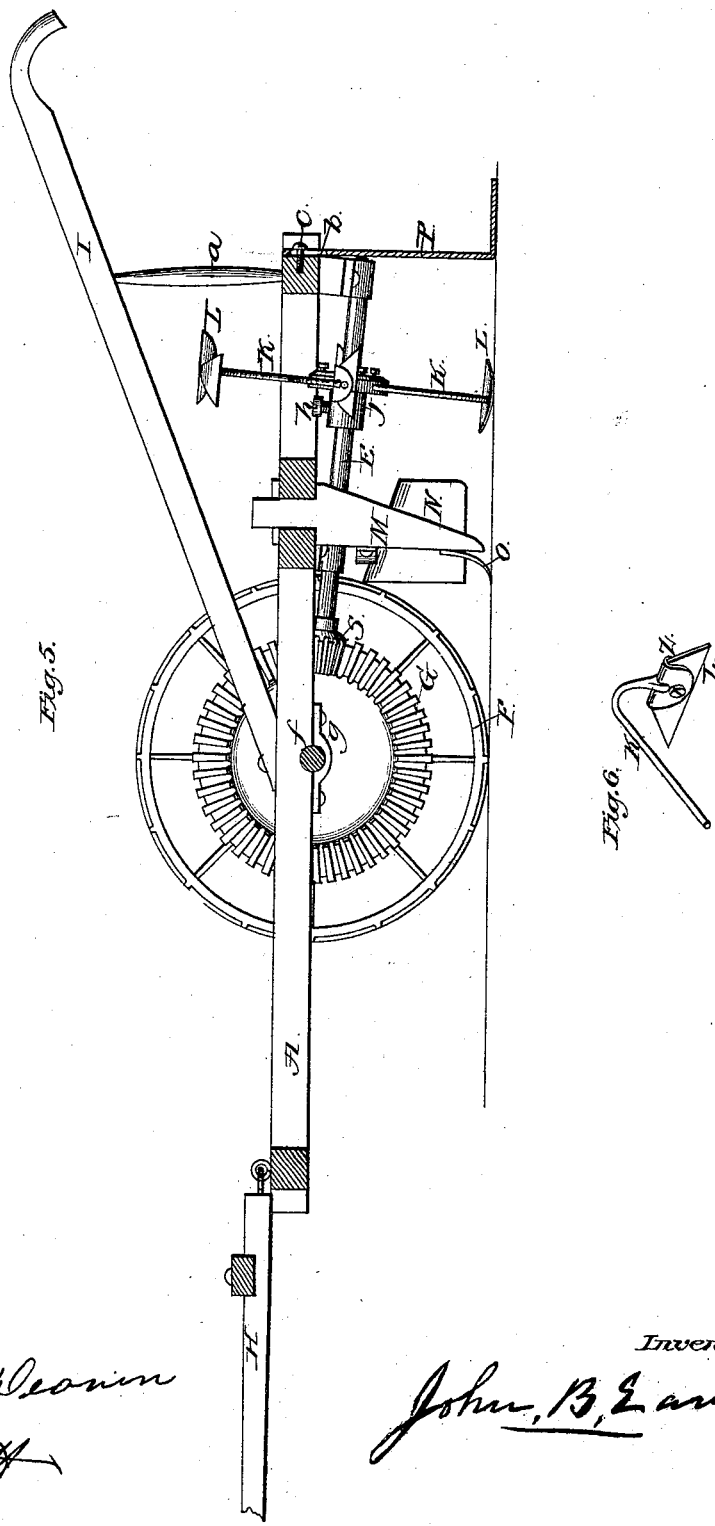
Attest:
Inventor:
John B. Eaves.

UNITED STATES PATENT OFFICE.

JOHN B. EAVES, OF RUTHERFORD COUNTY, NORTH CAROLINA.

IMPROVEMENT IN COTTON-CHOPPERS.

Specification forming part of Letters Patent No. 189,347, dated April 10, 1877; application filed March 15, 1877.

*To all whom it may concern:*

Be it known that I, JOHN BAXTER EAVES, of Rutherford county, and State of North Carolina, have invented a new and useful Improvement in Cotton Choppers and Cultivators, which improvement is fully set forth in the following specification, reference being had to the accompanying drawings.

The object of my invention is to produce a combined chopper and cultivator, having knives or blades for removing superfluous plants, and also other blades or plows for cultivating the plants that are allowed to remain, as well as adapting it for use on one or two rows of the plants; and the construction and operation of the device will hereinafter be fully described.

Referring to the drawings, Figure 1 represents a top view of a chopper and cultivator adapted for a single row of cotton. Fig. 2 is a side view of a drum, having curved radial arms, with the hoes or knives attached. Fig. 3 is a rear view of a sliding support or gage (which may be of varying widths) for steadying the machine and regulating the depth or height of the knives and cultivators. Fig. 4 is a top view of a chopper and cultivator for use on two rows of cotton simultaneously. Fig. 5 is a vertical sectional view of the machine; and Fig. 6 is a view of a modified form of a hoe or cutter.

The same letters of reference indicate like parts in all the drawings.

A suitable frame, A, is provided with cross-beams B B B B. Near the center of the frame, on its under side, are attached suitable bearings $g$, for the journals or ends $f$ of the axle D, which carries the gear-wheels G, which gear-wheels operate the revolving cutters. F are the driving-wheels, the tires of which may be corrugated or roughened, or they may be smooth, as may be desired. The axle D carries two large gear-wheels, G, in the double, and one gear-wheel in the single, cultivator, which mesh with smaller gear-wheels attached to the shaft or shafts E, carrying the revolving cutter or cutters, as will be hereinafter described.

The gear-wheels G are each provided with a sleeve or collar, $d$, having a set-screw, $e$, so that they, as well as the revolving cutters, may be adjusted to any desired width, and operate equally well whether the rows of cotton are far apart or close together. Thus I am enabled, in connection with other mechanism, which will be described hereafter, to cultivate a single row of cotton, or two rows simultaneously. Two of the cross bars or beams B are placed close together, as shown in Figs. 1 and 4, and support the vertical pieces or feet M. These vertical pieces are provided with shoulders, which rest against the under side of the cross-pieces, and are perforated near their upper ends and secured in place by toggles passing through said perforations and resting on top of the frame-bars B. These vertical pieces or feet carry the cultivator-blades O, which may be of any form desired, and attached to the lower end of the feet by screws or other well-known means. These feet are secured together in pairs by a cross-bar underneath the frame, one pair being used in the single, and two pairs in the double, machine. A guard or fender, N, is secured between each pair of feet, its purpose being to protect the plants from injury when the machine is in operation. The fenders or guards are supported between the plow-standards by a connecting-bar, and serve to protect the young plants from clods and from the action of the plows. They also converge from front to rear, and by this construction press together the row of plants and hold them firmly during the action of the cutters, which are arranged to cut close to the rear of the fenders. By removing the toggles the feet may be adjusted laterally to any width desired, or to correspond with the adjustment of the gear-wheels and the width of the rows of plants. The under sides of the rear bars are furnished with bearings for supporting the shafts or journals E, which carry the cutter-wheels, which are arranged to revolve at right angles to the line of draft, and are for the purpose of removing superfluous plants when they are close together in the rows. The shafts E are mounted in the bearings on the cross-bars, as before mentioned, parallel with the longitudinal bars of the frame, and have secured on their inner ends small bevel-wheels S, which mesh with the large bevel-wheels G, and when the machine is in operation, by the revolution of the driving-wheels, convey motion to the cutters, which, as before stated, revolve at right angles to the line of draft, and between the two rear cross-bars of the frame. These cutter-wheels consist of a hub or drum, J, having a collar and set-screw, h, similar in all respects to that on the larger bevel-wheels, to adapt them to adjustment on the shafts, or to be entirely removed, if desired. This hub or drum is provided with holes in its periphery to receive the curved radial arms K, which are detachably connected thereto by set-screws. By making the arms removable I am enabled to use any number that may be necessary. The blades L are made of varying widths, and are arranged so that the plants may be removed at regular intervals—for example, if it should be desired to have the plants ten inches apart, two blades, four and six inches wide respectively, would accomplish the purpose, the sum of the two being ten inches. I prefer to attach the blades as shown in Fig. 6, when the same are each provided with a clip, Z, to receive the blade, so that the blade may be easily attached or removed and another substituted by means of perforations in the blade and clip, and an ordinary screw. An adjustable L-shaped vertical standard or support, P, is attached to the rear cross-bar (which accomplishes the double purpose of supporting the machine when in operation or not in operation) by means of a slot, b, and set-screw c at its upper end for regulating the depth and height of both the cultivator-blades and the knives or cutters.

In a machine for cultivating a single row of plants I use two of these supports, one at each side. The machine is provided at its front end with suitable shaft mechanism, such as the ordinary thills for a single, and a pole or analogous device for a double, team. The handles I I are secured at their front ends to the frame over or nearly over the journals of the axle which carries the driving-wheels, and are supported at a suitable elevation by standards a, one end of each of said standards being inserted in the handles themselves and the other ends in the rear cross-bar.

By making the bevel-gearing which operates the revolving cutters, and the standards to which the cultivator-blades are attached, adjustable, the machine is adapted to the cultivation of cotton when the rows vary in width, and at the same time to the removing of such of the plants as are not wanted, and by means of the guards or covers are protected from injuring those plants which are allowed to remain. The radial arms of the cutters may be detached, and the machine may then be used as a cultivator alone, in what is known among cotton-planters as the "second working," the useless plants all having been removed the first time it is cultivated. The adjustable support at the rear of the frame regulates the depth or height of both the cultivator and cutter-blades, and, by means of the removable knives or cutters of varying widths, I am enabled to remove the plants at regular intervals. It is also obvious that by simply raising the machine in the rear by means of the handles, it may be turned easily at the end of the row, and without injury to the plants.

Having thus fully described the mode of constructing and using my invention, what I claim as new, and desire to secure by Letters Patent, is—

1. In a cotton-chopper, the combination of the rearwardly-converging fenders or guards N, with the revolving cutters arranged in close proximity thereto, said fenders serving to press together the row of plants and hold them during the action of the cutters, substantially as shown and bescribed.

2. In a cotton-chopper, the combination of the plows O, the rearwardly-converging guards or fenders N, and the revolving cutters, substantially as shown.

3. A revolving cutter for a cotton-chopper, consisting of a drum or hub, J, provided with detachable radial arms K, and detachable blades or knives L of different widths, arranged as described, so as to allow two or more of said blades to make a continuous unbroken cut equal to the combined width of the said blades, substantially as shown and described, and for the purpose set forth.

JOHN BAXTER EAVES.

Witnesses:
A. E. DEVEN,
M. GARDENER.